United States Patent [19]

Van Rosmalen

[11] Patent Number: 5,789,743

[45] Date of Patent: Aug. 4, 1998

[54] OPTICAL SCANNING DEVICE, AND APPARATUS PROVIDED WITH SUCH A DEVICE, EMPLOYING SCANNING ELEMENT HAVING REFLECTIVE MEASURING REFERENCE FACE

[75] Inventor: Gerard E. Van Rosmalen, Eindhoven, Netherlands

[73] Assignee: U.S. Philips Corporation, New York, N.Y.

[21] Appl. No.: 795,822

[22] Filed: Feb. 6, 1997

[30] Foreign Application Priority Data

Jul. 3, 1996 [EP] European Pat. Off. ............ 96201816

[51] Int. Cl.$^6$ ........................................... H01J 3/14
[52] U.S. Cl. ........................ 250/234; 250/236; 318/640
[58] Field of Search ........................... 250/234–236; 318/560, 640; 358/474, 493, 494; 359/216–219, 213

[56] References Cited

U.S. PATENT DOCUMENTS

| | | | |
|---|---|---|---|
| 3,706,484 | 12/1972 | Doi et al. | 350/7 |
| 4,829,175 | 5/1989 | Goto et al. | 250/236 |
| 4,841,135 | 6/1989 | Goto et al. | 250/236 |
| 5,171,984 | 12/1992 | Van Rosmalen | 250/236 |
| 5,245,182 | 9/1993 | van Rosmalen et al. | 250/236 |

FOREIGN PATENT DOCUMENTS

| | | |
|---|---|---|
| 0374857A1 | 6/1990 | European Pat. Off. |
| 0517517A1 | 12/1992 | European Pat. Off. |
| 62-56931A | 3/1987 | Japan |

OTHER PUBLICATIONS

"A Compact Optical Tape Recording System" G.E. Van Rosmalen, J.A.H. Kahlman, P.L.M. Put and C.M.J. Van Uijen, SPIE vol. 233U, Optical Data Storage 1994, pp. 8–14.

*Primary Examiner*—Stephone B. Allen
*Attorney, Agent, or Firm*—Michael E. Belk

[57] ABSTRACT

An optical scanning device is described, which is provided with a scanning element having a reflecting measuring reference face (31), and a position detection system (80) which supplies, inter alia, a measuring signal ($S_z$) for the position of the scanning element in a direction perpendicular to the reference face. By implementing the scanning element in a very thin form and by correcting said measuring signal (S) by means of the polygon bending signal ($S_b$) supplied by the position detection system, a very rapid and accurate scanning can be realized.

16 Claims, 7 Drawing Sheets

OPTICAL SCANNING DEVICE, AND APPARATUS PROVIDED WITH SUCH A DEVICE, EMPLOYING SCANNING ELEMENT HAVING REFLECTIVE MEASURING REFERENCE FACE

The invention relates to a scanning device comprising a scanning element and a controlling system for controlling the position of the scanning element, a non-scanning surface of said scanning element constituting a measuring reference face, said controlling system comprising a position detection system for detecting the position of the scanning element, an output of said system being connected to a control circuit for correcting the position of the scanning element in a direction perpendicular to the reference face.

The invention also relates to an optical apparatus for scanning a medium, which apparatus is provided with such a scanning device.

The term medium should be considered to have a wide meaning and comprises, for example a tape-shaped, record carrier, a photosensitive layer in a printer, or an image display panel which can be written with electromagnetic radiation and in which the information is constituted by the written image.

A non-scanning surface of the scanning element is understood to mean a surface which is not provided with elements ensuring the scanning.

Since the introduction of the digital optical recording technique, there has been an increasing need of raising the storage capacity of the medium used so that, for example, a digital video signal can be stored on such a medium. In the known audio disc, or compact disc (CD) and media derived therefrom, such as CD-ROM, CD-I, etc., the storage capacity is determined by the size of the scanning spot formed in the information plane of these media, which scanning spot determines the resolving power of the scanning device and hence the minimum dimensions of the information details, for example information pits which can still be detected separately. It is true that the size of the scanning spot can be reduced by decreasing the wavelength of the scanning beam used and/or by increasing the numerical aperture of the objective system with which the scanning spot is formed, but this is only possible to a limited extent and cannot lead to an increase of the storage capacity by a factor of ten or more.

As described in the article "A Compact Optical Tape Recording System" in: SPIE, Vol 2338 Optical Data Storage, 1994, pp. 8–14, the storage capacity and scanning velocity may be increased by several orders of magnitude while maintaining the conventional scanning spot size by making use of a tape-shaped record carrier which, viewed in the longitudinal direction, is moved along an optical scanning device and in which the information is provided in information tracks extending in a direction perpendicular to the longitudinal direction of the tape. To scan these information tracks, the scanning device comprises a scanning element in the form of a mirror polygon having, for example six mirror faces, or facets. Upon rotation of the mirror polygon, each facet of the consecutive mirror facets ensures that an information track is scanned, hence is written or read.

In the scanning device described in the SPIE article, the mirror polygon is journaled and driven electromagnetically. The position of the mirror polygon in five degrees of freedom is continuously detected so as to be corrected, if necessary. To this end, the known device comprises a position detection system in which a radiation beam is generated, a part of which is reflected as a measuring beam by a beam splitter to the upper side of the polygon which functions as a reference face. A special lens which focuses the peripheral portion of the measuring beam in the center of curvature of a spherical element provided on the central part of the reference face is arranged between the beam splitter and the reference face. This peripheral portion constitutes a first measuring sub-beam. A second measuring sub-beam is constituted by the central portion of the measuring beam on which the lens does not perform a lens action, but gives only the chief ray of this measuring sub-beam a different direction than that of the chief ray of the first measuring sub-beam. The first and second measuring sub-beams reflected by the reference face are passed by the beam splitter to a first and a second detector, respectively, which detectors convert the beams into electric signals. Each of these detectors is constituted by a quadrant detector, i.e. a detector consisting of four detector segments arranged in four different quadrants.

To obtain a sufficiently high scanning velocity in the tape scanning apparatus and in other apparatuses in which a mirror polygon is used as a scanning element, the polygon must be rotated at a high frequency, for example 2 kHz. To achieve such a rotation frequency, as described in said SPIE article, the polygon is placed in vacuum and is implemented as small and light as possible. Since the mirror polygon must have a given rigidity, its height, i.e. the dimension perpendicular to the scanning direction, is relatively large as compared with its diameter.

It is an object of the invention to provide a scanning device in which the polygon is lighter, while the stability, notably of the height control, does not decrease.

To this end, the scanning device according to the invention is characterized in that the scanning element is disc-shaped, and in that the position detection system supplies a signal which is representative of the bending of the scanning element, said signal being applied to said control circuit via a low-pass filter in order to stabilize the control in said direction.

In designing this scanning device, it was assumed that the height of the mirror polygon is not prescribed by the rigidity of this polygon but by the diameter of the scanning beam at the location of the polygon. The height of the facets, and hence that of the polygon, should only be approximately as large as the beam diameter. Based on a further idea, only the mirror facets need to have this height and the central part of the mirror polygon may be thinner so that its weight may be further reduced, which leads to an even faster start-up and an even higher scanning velocity. To prevent that axial resonances of the mirror polygon, i.e. resonances in the direction perpendicular to the reference face, render the axial control unstable due to periodical bending of the thin polygon, the bending is measured by means of the second measuring sub-beam, and after differentiation the bending signal is added as a damping signal to the axial control signal.

The scanning element may be implemented in various ways; for example, this element may be constituted by a rotating transmissive prism. However, the scanning device according to the invention is preferably further characterized in that the scanning element is a disc-shaped mirror polygon which has mirror facets at its circumference and one of the disc surfaces of which is the reflecting reference face. Rotation frequencies of 3 kHz have been realized with this scanning element.

A preferred embodiment of the scanning device, in which a satisfactory control of the position of the scanning element is realized, is further characterized in that the controling system is adapted to control the positions of the scanning element along the three axes of an orthogonal system of coordinates, and the rotations of this element about two of these axes, in that the reflecting reference face is provided with a spherical element, in that the position detection system is adapted to detect said positions and rotations, in that the position detection system comprises a radiation source for supplying a measuring beam, an optical system, provided with a beam splitter, for forming a first measuring sub-beam, focused in the center of curvature of the spherical element, for measuring said positions, and a second measuring sub-beam, incident outside the spherical element on the reference face, for measuring said rotations, and a first and a second detector for the first and the second measuring sub-beam, respectively, arranged in the path of the radiation reflected by the reference face and passing through the optical system, an output of the first detector being connected to a control circuit for correcting the position of the scanning element in a direction perpendicular to the reference face, and in that an output signal of the second detector is the bending signal which is applied to said control circuit via the low-pass filter.

The position detection system itself, for measuring the displacements along the three axes and the rotations about two axes, may be implemented as described in said SPIE article "A Compact Optical Tape Recording System". In the known position detection system, only a part, for example half, of the measuring beam radiation is reflected towards the reference face and used for the measurements, while the rest of this radiation is lost. Moreover, the lens used therein for focusing the measuring beam is a very unconventional lens which is difficult to manufacture and renders the system expensive.

An improved embodiment of the position detection system, in which a normal lens may be used for focusing and in which, moreover, better use is made of the available measuring beam radiation, is characterized in that the optical system is further provided with a reflector which reflects the part of the measuring beam passed by the beam splitter as one of the measuring sub-beams towards the reference face, and in that the beam splitter reflects the other part of the measuring beam as the other measuring sub-beam towards the reference face.

In this position detection system, the measuring sub-beams are no longer formed by a lens having a special shape but by the beam splitter, so that it has a dual function and does not necessitate the use of a specially formed lens. Moreover, a maximum quantity of radiation of the measuring beam is now used for the measurements so that stronger measuring signals are obtained. The beam may splitter be a polarization-neutral beam splitter, but it may alternatively be constituted by the combination of a radiation-sensitive beam splitter and a quarter-wavelength plate.

To realize a large capturing range, the elements of the two detectors should be relatively large and these detectors should be spaced apart at a relatively large distance from each other. This is possible if the position detection system is further characterized in that the beam-separating face of the beam splitter extends at such an angle to the chief ray of the measuring beam that the measuring sub-beam reflected thereby is incident on the reference face at an acute angle to the normal, in that said measuring sub-beam is the second measuring sub-beam, and in that a converging lens system is arranged in the path of the first measuring sub-beam reflected by the reflector.

A preferred embodiment of the position detection system is further characterized in that the second measuring sub-beam also measures the rotation of the object about the third axis, and to this end, the reference face is provided with at least an area having a reflection which is different from its surroundings.

This embodiment is particularly important in a scanning apparatus for a tape-shaped record carrier.

Since the position detection system also supplies a measuring signal which represents the rotation around the Z axis, or the axis of rotation of the mirror polygon, it is not necessary to use a separate detection system for generating this signal.

The invention also relates to an optical apparatus for electromagnetically scanning a medium, which apparatus is provided with an optical scanning device which, in operation, scans the medium in at least one direction by means of an electromagnetic radiation spot. This apparatus is characterized in that the position detection system is a system as described hereinbefore.

This apparatus may be, for example a laser printer in which a scanning laser beam is used for initially providing signs, symbols or graphic representations in a photosensitive layer which is subsequently passed through an ink bath and then printed on paper. In the laser printer, a scanning spot moves with great velocity across the successive lines and the transition from a first line to the next is realized by moving, at a smaller velocity, the photosensitive layer in a direction perpendicular to the radiation spot scanning direction.

The apparatus may also be a picture display apparatus which is provided with at least a reflecting liquid crystalline picture display panel comprising a photoconducting layer. The picture to be displayed is written by scanning the photoconducting layer by means of the scanning spot in accordance with a matrix pattern, the beam forming the scanning spot being modulated in conformity with the picture information to be displayed. For scanning in a first direction at a high velocity, the above-mentioned fast scanning element is used for which the position is controled by means of the position detection system described hereinbefore. A second scanning element, for example a vibrating mirror may be used for the slower scanning in the second direction.

The invention finds a special application in an apparatus in which the medium is a tape-shaped optical record carrier for recording a structure of optically detectable information areas arranged in information tracks which extend in a first direction transversely to the longitudinal direction of the tape, said apparatus being provided with a supply reel and a take-up reel for transporting the tape in its longitudinal direction, and a radiation source for supplying a scanning beam, the scanning device realizing a scanning movement of the scanning beam in the first direction.

These and other aspects of the invention will be apparent from and elucidated with reference to the embodiments described hereinafter.

Figure 1:
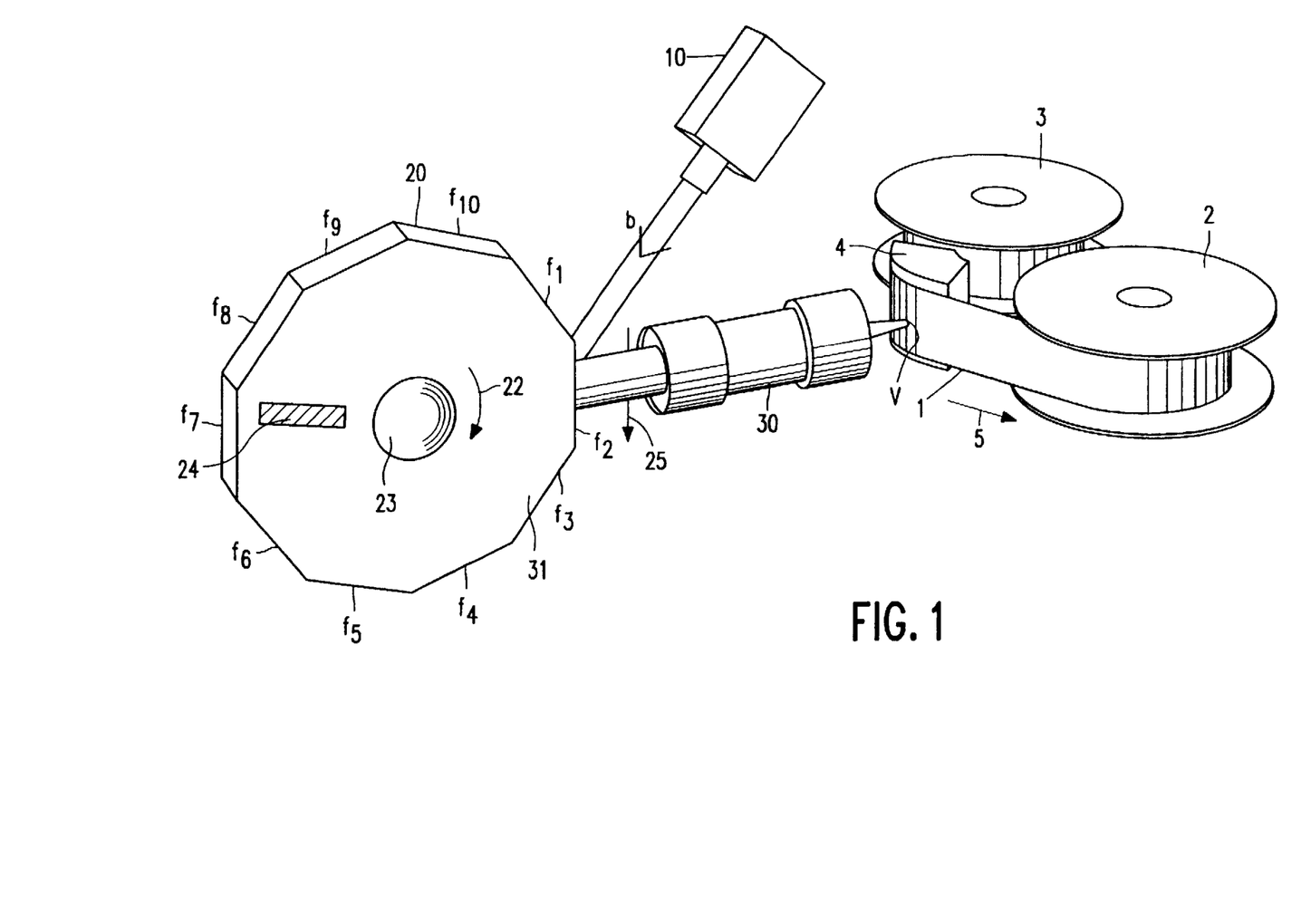
FIG. 1 shows the circuit diagram of an apparatus for scanning an optical tape.

In FIG. 1, the reference numeral 1 denotes a tape-shaped record carrier. This record carrier is directly transported from a supply reel 3 to a take-up reel 2 across a stationary guiding element 4. The apparatus does not have to comprise any further tape-guiding elements. Both reels are driven by separate motors (not shown). The motors may be driven in such a way that the tape tension remains constant. The tape travel direction is denoted by means of the arrow 5.

The scanning device of the apparatus comprises a radiation source detection unit 10 which supplies a scanning beam b, a rotating mirror polygon 20 which reflects the, for example parallel, beam to an objective lens 30 focusing the beam to a radiation spot V on the tape. The mirror polygon comprises, for example ten mirror facets $f_1$–$f_{10}$ which are, for example parallel to the axis of rotation of the mirror polygon. During operation, this polygon rotates in the direction of the arrow 22. Each facet rotating in the radiation path of the beam, facet $f_2$ in the drawing, will move the beam in the direction of the arrow 25, perpendicularly to the tape travel direction 5, across the entrance pupil of the objective lens. The radiation spot V formed by this lens then scans a track extending in the direction perpendicular to the direction 5. A second, a third, etc. track are consecutively scanned by means of the facets $f_1$, $f_{10}$, etc.

The beam coming from the unit 10 and incident on a mirror facet is located in the plane defined by the scanning beam coming from the mirror polygon and extends at an angle of, for example 38° to the central position of the scanning beam which is moved, for example through an angle of 48°. The objective lens, in the form of an f-θ lens has, for example an effective focal length of 1.25 mm and a numerical aperture of 0.45. The scanning spot can then be moved, for example through a distance of 1 mm in the vertical direction. In this way, it is possible to write and read tracks having a length of 1 mm in the direction perpendicular to the tape travel direction.

A plurality of horizontal strips of vertical information tracks may be written on a tape. To this end, tracks with a length of 1 mm are first written from the beginning to the end of the tape. Then the travel direction of the tape is reversed, the tape and the optical system are displaced through a distance of slightly more than 1 mm with respect to each other and the next horizontal strip of vertical tracks is written. Thus, 12 strips with information tracks can be provided on a tape having a width of 12.7 mm. The apparatus is also suitable for recording tapes having a width of 8 mm. Reading a written tape is effected in a manner analogous to that for writing. Then the beam reflected by the tape traverses the same optical path in the reverse direction to the radiation source detection unit. The information signal, the focus error signal and the tracking error signal are obtained in a similar way as in an optical audio disc (CD) player.

The radiation source detection unit comprises a high-power diode laser having a wavelength of, for example 780 nm. If the objective lens has an NA of 0.45, a resolving power which is comparable to that of the Compact Disc system is obtained. Then an information density of 1 bit/µm can be achieved, and a tape having a width of 12.7 mm and a length of 42 m may comprise 50 Gbytes of information.

The information density in the track direction is, for example 0.6 µm/bit so that a track may comprise approximately 1600 bits. The nominal rotation frequency of the mirror polygon is, for example 2000 revolutions per sec. The scanning frequency of a mirror polygon with ten facets is then 20 kHz. At 1600 bits per track, a bitrate of 32 Mbits per second is achieved. The track period is, for example of the order of 1.6 µm. At a scanning frequency of 20 kHz, the tape speed is then 3.2 cm/sec during reading and writing. This is a relatively low speed so that no complicated tape transport mechanism is required.

Figure 2:
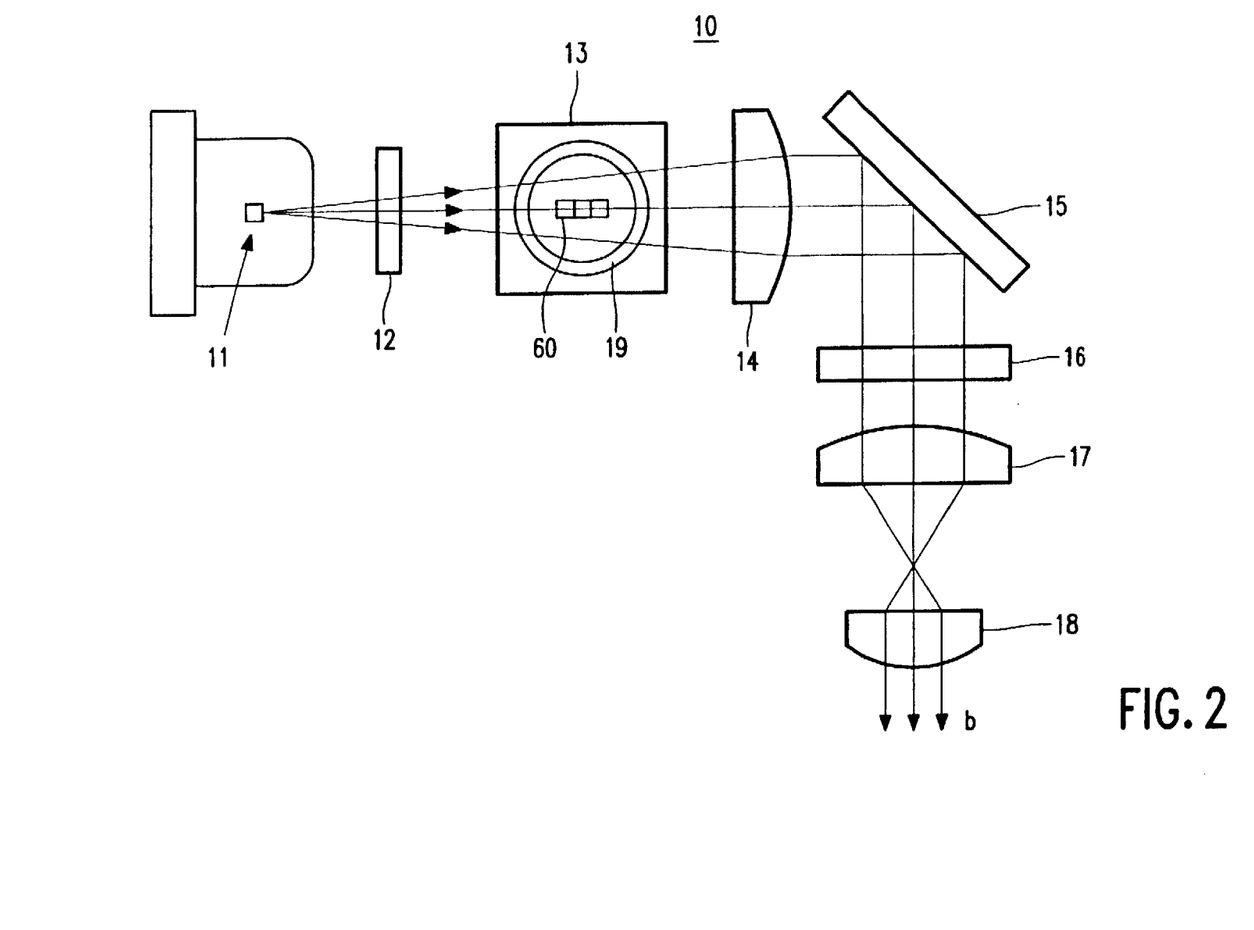
FIG. 2 shows an embodiment of a radiation source detection unit used in this apparatus.

FIG. 2 shows a cross-section of an embodiment of the radiation source detection unit 10. This embodiment resembles that used in the Compact Disc systems. The unit comprises a radiation source 11 in the form of a diode laser supplying a diverging beam b. This beam is split by a diffraction grating 12 into a central main beam, which is used for writing and reading information, and two auxiliary beams (not shown) which are used for tracking. These beams traverse a polarization-sensitive beam splitter 13 and are converted into parallel beams by a collimator lens 14. Via a quarter-wavelength plate 16, the beams leave the radiation source detection unit on their way to the mirror polygon 20. A folding mirror 15 for reducing the length of the unit may be arranged between the collimator lens 14 and the plate 16. If necessary, a telescopic system consisting of an objective lens 17 and a collimator lens 18 may be arranged behind the plate 16 so as to reduce the beam diameter to a desired value of, for example 1.1 mm. After reflection on the mirror polygon, the beams are focused by the objective lens 30 on the tape so that a main spot, or scanning spot, V and two auxiliary spots are produced on this tape.

After passing the objective lens 30, the beams reflected by the tape are reflected to the unit 10 by the mirror polygon and traverse this unit in the reverse direction as far as the beam splitter 13. There, the beams are reflected from the path of the on-going beams in a direction perpendicular to the plane of the drawing so as to reach the radiation-sensitive detection system 60. A cylindrical lens 19 with which notably the main beam can be rendered astigmatic is arranged between the beam splitter 13 and the system 60. This beam is incident on a four-quadrant detector with which the shape of the main spot formed in the detection plane can be determined, which main spot shape is determined by the extent of focusing of the beam on the tape. For tracking, two auxiliary beams, which cooperate with separate detectors, are used in this embodiment, because a satisfactory tracking error detection can be realized therewith, independent of the nature of the information bits in the tracks. As the facets of the mirror polygon are parallel to the axis of rotation of this polygon, the auxiliary spots move along straight lines parallel to the path traversed by the main spot. Consequently, use can be made of the standard three-spot tracking system as used in the Compact Disc systems.

It is to be noted that the radiation source detection unit shown in FIG. 2 is only one of the possible embodiments. This unit may be modified in various ways known from the Compact Disc technology. For example, for the focus detection, the cylindrical lens may be replaced by a roof prism which splits the beam reflected by the tape into two sub-beams each cooperating with a detector pair. The position of each sub-beam with respect to the associated detector pair is then a measure of focusing. The tracking signal may not only be generated by using two auxiliary spots but may alternatively be generated from the scanning beam only, by splitting the detector for this beam into two parts. By subtracting the signals of the detector from each other, a tracking signal is obtained. This method is known as the push-pull method. The beam splitter 13 may be replaced by a diffraction grating which deflects the scanning beam reflected by the tape towards the detection system. This grating may be divided into two parts or have an astigmatic implementation.

The objective, or scanning lens 30 may be arranged in an actuator (not shown) so that this lens can be moved in two directions, one movement serving for focus setting and the other for tracking. In order to define an average focus position, the tape is transported via the guiding element 4. However, a low-frequency change of the distance between the tape surface and the lens 30 may then still occur, for example, due to variations in tape thickness. This may be compensated by said first movement, so that the distance between the lens and the tape surface can be varied in such a way that the focal plane of the lens always coincides with the tape surface. This focus control may have a very small bandwidth. If the focal plane of the lens 30 is tilted with respect to the tape surface, a focus tilt correction must be performed. To this end, the guiding element may have a tiltable implementation.

When writing an empty tape, the objective lens is fixed in a stationary position. The system has a sufficiently high stability to write perfectly straight tracks with a constant track period. No vibrations at a frequency of the order of the scanning frequency occur in the system.

When reading a written tape, three unwanted relative movements of the scanning spot and a scanned track might occur. The first is a movement of the tape in a direction parallel to the track direction. This movement is not troublesome because the scanning path length is chosen to be larger than the track length. This ensures that the track is always within the scanning area. The only effect of this movement is that a small delay occurs in the signal which has been read. The second unwanted movement is caused by small variations of the tape travel speed. These variations may result in a mean tracking error. During reading and rewriting the tape, this error can be compensated by the second movement of the lens made possible by the lens actuator, namely a rotation of the lens about an axis which is parallel to, and preferably located in, the rear focal plane of this lens. This axis has a direction which is parallel to the track direction. In this way it is possible to shift the scanning path in a direction perpendicular to the track direction for the purpose of compensating said tracking error. The third unwanted movement is caused by a tilt of the tracks with respect to the scanning path. To compensate this, the scanning path may be tilted in a corresponding manner by tilting the mirror polygon.

In this way, all irregular tape movements can be compensated by active servocontrols so that a very accurate tape-guiding system with microprecision is not necessary. The tape transport mechanism is very simple: the tape is directly transported from one reel to the other via only one guiding element 4.

The mirror polygon is journaled electromagnetically and may move in six degrees of freedom. These movements must be detected so that they can be corrected, if necessary. To this end, a position detection system is provided, with which movements of the mirror polygon along three axes and tilts about two of these axes can be measured. This system also provides the possibility of measuring the rotation of the mirror polygon about its rotation axis. This system has a simple set-up and the available measuring radiation is used efficiently so that measuring signals having the maximum strength are obtained.

Figure 3:
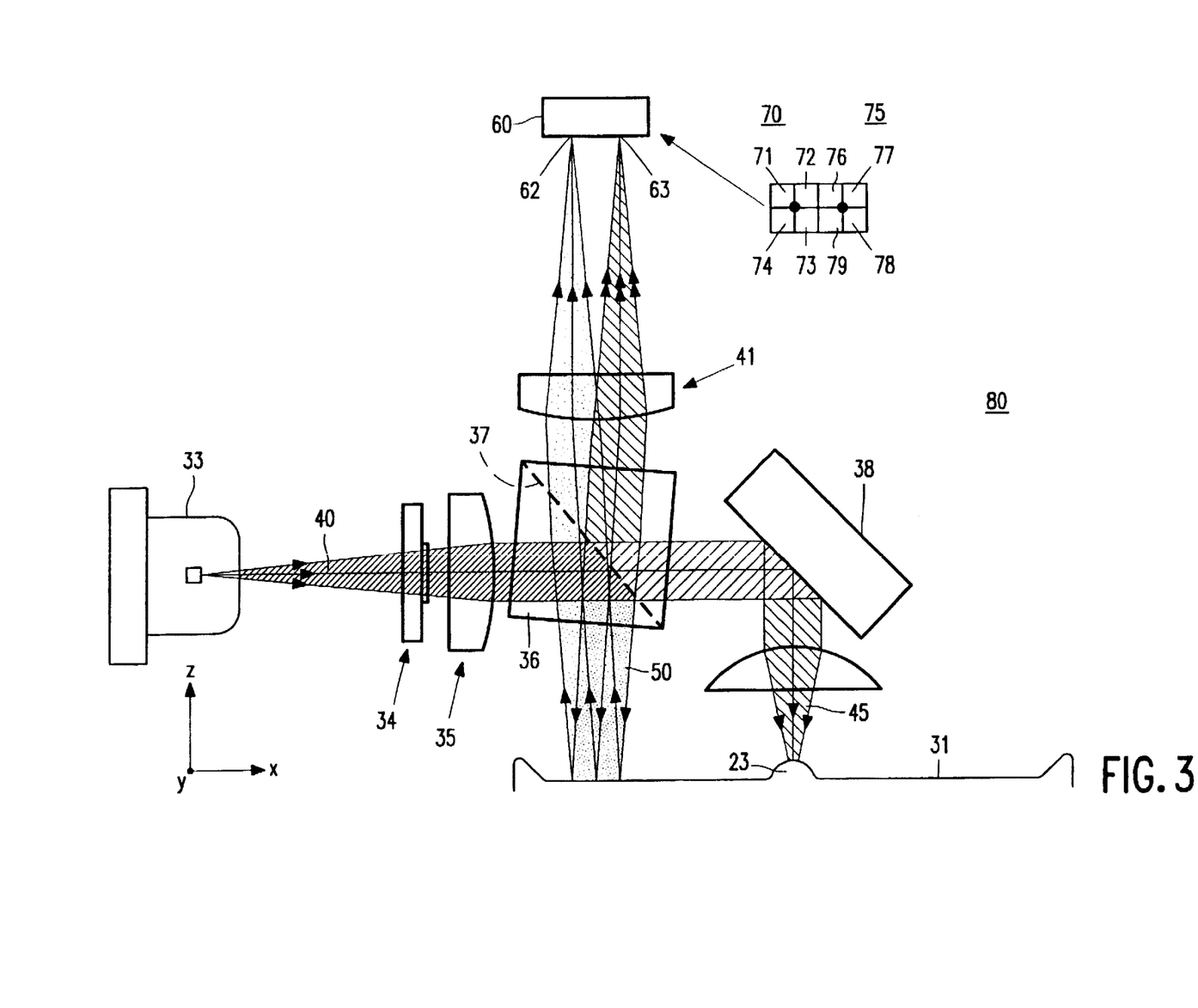
FIG. 3 shows the principle of the optical detection system for controling the position of the mirror polygon in this apparatus.

FIG. 3 illustrates the principle of the position detection system 80. The system is arranged at the side of the mirror polygon where the spherical element 23, see FIG. 1, is present. In FIG. 3, the reference numeral 33 denotes a diode laser emitting a radiation beam 40. This beam is first converted by a collimator lens 35 into a parallel beam. Subsequently, the beam 40 is incident on a splitting cube 36 with a separating face 37 which reflects a part of the measuring beam 40 as measuring sub-beam 50 towards the polygon. This polygon is denoted by the face 31, which is visible in FIG. 1 and is indicated hereinbefore as the reference face. This face is reflective and is provided in the center with a semiconvex element 23 which is also shown in FIG. 1 and is also reflective. The part of the measuring beam 40 which is not reflected by the splitting cube is passed towards a reflector 38 which reflects this part as a measuring sub-beam 45 towards the spherical element 23 on the reference face 31. This, first, measuring sub-beam is focused by an objective lens 39 in the center of curvature of the spherical element 23. The measuring sub-beam reflected by the element 23 traverses the objective lens 39 again and is reflected by the reflector towards the beam splitter 36 which reflects a part 45 of the beam towards a radiation-sensitive detection system 60 comprising a plurality of detection elements. A lens 41 converting the measuring sub-beam into a converging beam 55 is arranged between the beam splitter and the detection system 60. When the mirror polygon is moved in the X direction, in the plane of the drawing, and in the Y direction, perpendicular to the plane of the drawing, the radiation spot formed by the first measuring sub-beam in the detection plane moves in the X and Y directions, respectively, with respect to the elements of the detection system 60. This movement can be measured by combining the output signals of the detection elements in known manner. A cylindrical lens 34 is arranged in the radiation path for measuring the movement of the polygon in the Z direction, in the plane of the drawing. This lens converts the diode laser beam into an astigmatic beam. After reflection by the reference face, such a beam forms a radiation spot in the detection plane, which spot has a shape which is dependent on the extent to which the beam is focused in the center of curvature of the spherical element 23. If the beam is sharply focused at this point, i.e. if the reference face has the correct position with respect to the position detection system, said radiation spot is round. When the position of the reference face deviates from the desired position, i.e. when the beam is no longer sharply focused in said center of curvature, said radiation spot has an elliptical shape. The shape of the radiation spot, and hence the Z position of the reference face of the mirror polygon, may be detected in known manner by means of a four-quadrant detector accommodated in the detection system 60.

Alternatively, the cylindrical lens 34 may be arranged between the beam splitter and the detection system 60, instead of between the radiation source 33 and the beam splitter 36. The neutral beam splitter 36 may also be replaced by the combination of a polarization-sensitive beam splitter and a quarter-wavelength plate. Then, in principle, all radiation from the reference face 31 is passed towards the detection system 60. Instead of a splitting cube which is polarization-sensitive or not sensitive, a plane-parallel plate having a separating layer which is polarization-sensitive or not sensitive may be arranged at an angle of 45° to the chief ray of the beam 40. Such a plate also introduces astigmatism in the beam so that the cylindrical lens 34 is then no longer required.

The second measuring sub-beam 50 reflected by the beam splitter is incident on a flat portion of the reference face 31. This beam is reflected by the reference face and a part thereof is passed by the beam splitter to the detection system 60, which beam is also converged by the lens 41. Upon tilting the mirror polygon and the reference face 31 about the X and/or Y axis, the radiation spot formed by the second measuring sub-beam in the detection plane is moved across the detection elements of the system 60 in the X and/or Y direction, so that these tilts can be measured.

By giving an area or strip of the flat portion of the reference face a lower or higher reflection coefficient than the rest of this face, as is denoted by means of the strip 24 in FIG. 1, the intensity of the second measuring beam can be decreased or increased for a short time interval so that a further measuring possibility is created for the detection system. If a single area having a deviating reflection is present, the intensity of the second measuring beam will be decreased or increased once per revolution of the mirror polygon, and the detector signal generated by this beam will have a minimum or maximum value once per revolution. Then, the number of revolutions of the mirror polygon per unit of time, second or minute, hence the speed of rotation or rotation frequency of the mirror polygon can be determined. Said area or strip may consist of a dark or dull area or strip, or of a diffusing area obtained by roughening or the provision of a grating. The size of this area is preferably equal to the cross-section of the second measuring sub-beam for obtaining a maximal effect.

Instead of a single area or strip, a plurality of radially varying strips or lines may be provided on the flat portion of the reference face. Then, the detector signal generated by the second measuring sub-beam has a corresponding number of minima or maxima per revolution. The relative angle of rotation of the mirror polygon can then be measured. The number of strips is determined by the desired accuracy with which the angle of rotation is to be measured, and by the size of the radiation spot formed by the second measuring sub-beam on the reference face. Each strip may consist of a dark or dull line or of a diffusing groove.

Instead of providing a strip or a number of strips having a deviating reflection in the reference face, for the purpose of measuring the speed of rotation, the reference face may be implemented in such a way that it has a monotonous linear variation of the reflection through 360°. Then, the detector signal is a sawtooth-shaped signal with a period corresponding to one rotation. The linearly increasing or decreasing reflection can be obtained by linearly varying the extent of dullness or by linearly varying the strip density if the reference face is provided with strips through 360°.

Figure 4:
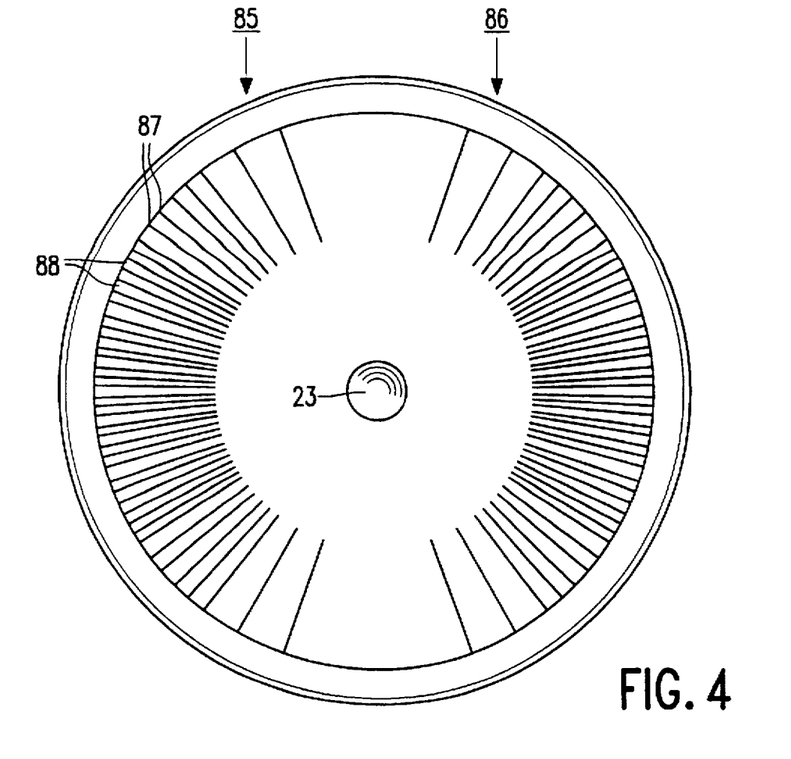
FIG. 4 shows an embodiment of a strip pattern to be provided on the reference face.
Figure 5:
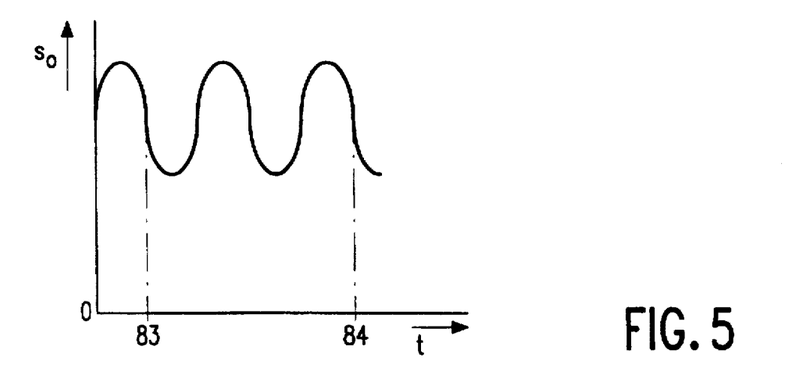
FIG. 5 shows the rotation speed signal obtained by means of this pattern.

FIG. 4 shows a strip pattern to be provided on the reference face for measuring the speed of rotation, which is specially suitable for combination with the polygon drive motor described in the above-mentioned article "A Compact Optical Tape Recording System" in: SPIE, VOL 2338, Optical Data Storage, 1994, pp. 8–14, and which is provided with two layers of four magnet coils each. As is shown in FIG. 4, the strip structure comprises two groups of strips 85 and 86 each extending through 180°. In each group, the density of the strips 87 initially increases and then decreases. If such a strip pattern rotates under the second measuring sub-beam, the intensity of this beam will vary and hence the detector signal generated by this beam, as is shown in FIG. 5. In this Figure, the time t is plotted horizontally and the value of the detector signal $S_o$ is plotted vertically in arbitrary units. The time interval between the vertical lines 83 and 84 corresponds to one revolution. During a revolution, the sinusoidal signal $S_o$ changes sign four times. This signal is very suitable for directly driving the polygon motor described in said SPIE article.

In the position detection system described, the first measuring sub-beam 45 is used for detecting displacements along the three axes, X, Y and Z, and the second measuring sub-beam 50 is used for measuring rotations about these three axes. A separate detection system for measuring the relative angle of rotation of the mirror polygon is then no longer required.

To have a sufficiently large capturing range for the various measuring signals, the detection elements of the system 60 must have a given size and the radiation spots 62 and 63 must be sufficiently spaced apart. As is shown in FIG. 3, the beam-separating face 37 is therefore arranged obliquely in the radiation path of the measuring beam, i.e. this face extends at an angle different from 45° to the chief ray of the beam 40. It is thereby achieved that the second measuring sub-beam 50 reflected by the beam splitter is incident on the flat portion of the reference face 31 at an angle different from 90°. The reflected beam 50 then passes obliquely through the system and the lens 41 focuses this beam in a radiation spot 62 which is located to the left of the system axis. The first measuring sub-beam 45 is perpendicularly incident on the spherical element 23. The reflected beam 45 is now obliquely incident on the separating face 37 of the beam splitter 36 and is consequently deflected to the right so that this beam is also obliquely incident on the lens 41. The radiation spot 63 formed by this beam in the detection plane is then located to the right of the system axis. The radiation spots 62 and 63 are now spaced apart so far that a sufficiently large capturing range is realized.

The detection system 60 is shown in a bottom view in the upper part of FIG. 3. This system comprises two quadrant detectors 70 and 75 with detection elements 71, 72, 73 and 74 and 76, 77, 78 and 79, respectively. If the signals of the detection elements 71, 72, 73 and 74 are represented by a, b, c and d, and those of the detection elements 76, 77, 78 and 79 by p, q, r and s, then the displacements Mx, My and Mz in the X, Y and Z directions, respectively, are given by:

$$Mx=(p+s)-(q+r)$$

$$My=(p+q)-(r+s)$$

$$Mz=(p+r)-(q+s)$$

and the rotations $\phi_x$, $\phi_y$, $\phi_z$ about the X, Y and Z axes are given by:

$$\phi_x=(a+b)-(c+d)$$

$$\phi_y=(a+d)-(b+c)$$

$$\phi_z=a+b+c+d,$$

in which the signal $\phi_z$ has, for example, a jump where a strip with a reduced reflection passes underneath the beam 50, or where the signal has a sinusoidal variation.

Instead of about the Y axis, as is shown in FIG. 3, the beam splitter 36 may alternatively be tilted about the chief ray of the beam 40 so as to achieve that the radiation spots 62 and 63 are spaced sufficiently far apart.

To minimize the mass of the mirror polygon, the height of the mirror polygon, i.e. the dimension in the Z direction in FIG. 3 is as small as possible. In principle, the height of the mirror facets, and hence that of the polygon, should only be of the order of the diameter of the scanning beam at the location of the mirror polygon. The mass of the polygon may be further reduced by making its central part thinner than the peripheral part where the facets are provided.

When such a polygon is used in the scanning device, parasitic mechanical resonances may be produced in the Z direction due to the alternating concave and convex bending of the polygon. This parasitic resonance, which has a relatively low frequency and a relatively large amplitude, renders the servocontrol in the Z direction unstable.

Figure 6:
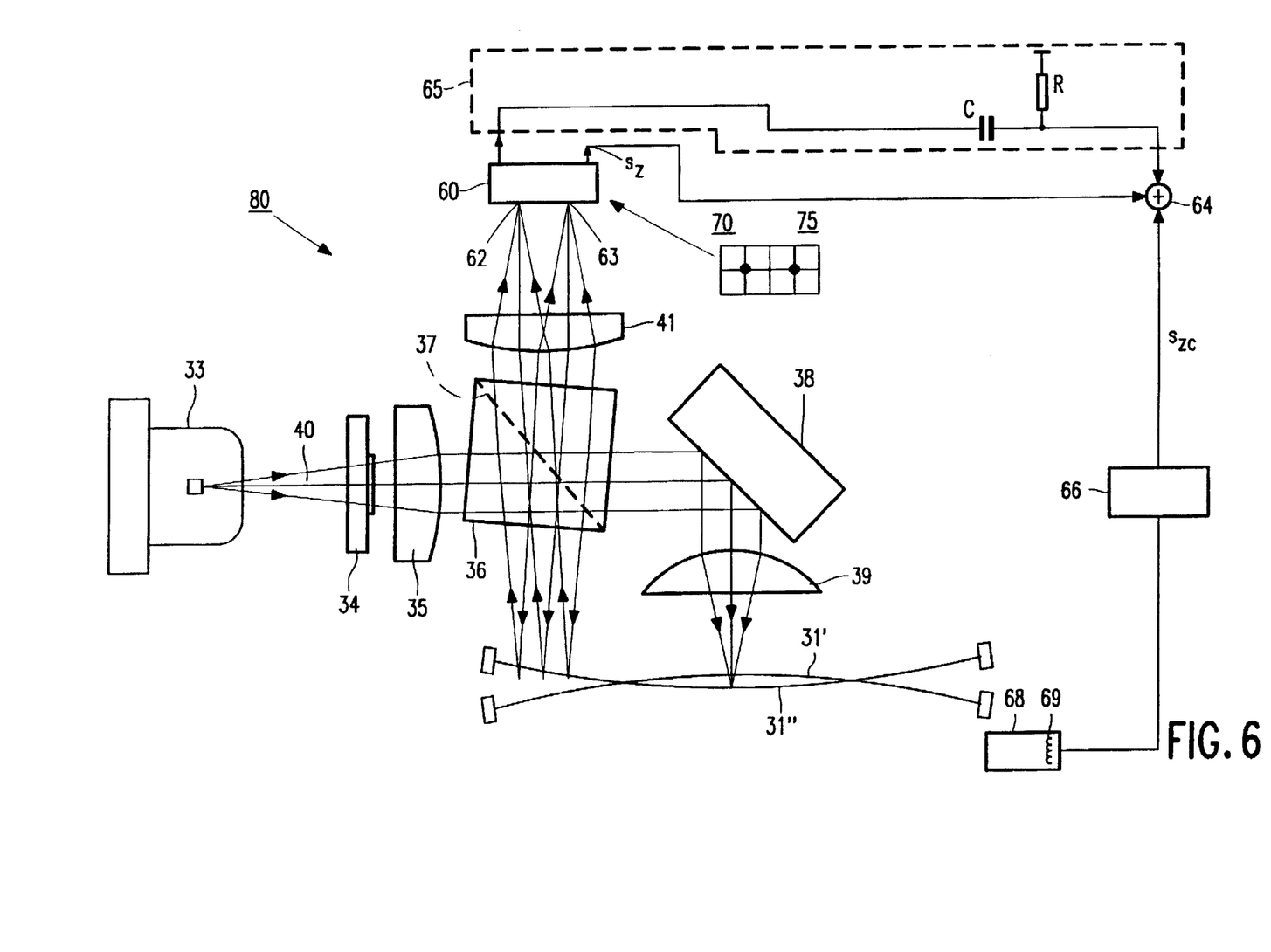
FIG. 6 shows the principle of the scanning device according to the invention, using compensation for the polygon bending.

In FIG. 6, the reference numeral 31' denotes a convex mirror polygon and the reference numeral 31" denotes a concave mirror polygon. It is immediately clear that, due to bending, the height of the reference face at the location of the chief ray of the first measuring sub-beam 45 changes without having to change the position in the Z direction of the mirror polygon as a whole. FIG. 6 also shows how, in accordance with the invention, the parasitic resonance can be damped. Due to the bending, the reference face 31 at the location of the second measuring sub-beam 50 is tilted, as it were, because of the circular symmetry of the polygon about the X axis as well as about the Y axis. These tilts may be detected by the detector 60. Since the tilt angles are alternately positive and negative due to bending, the bending signal is a periodical signal which can be distinguished from a tilt signal produced when tilting the entire mirror polygon about the X axis and/or the Y axis.

The bending signal $S_b$ supplied by the quadrant detector 70 and the associated processing electronic circuitry is applied to a combination circuit 64 via a low-pass filter 65 which is shown diagrammatically by means of a resistor R and a capacitor C. The height measuring signal $S_z$ coming from the detector 60 is applied to another input of this combination circuit. The combined, hence corrected, height measuring signal $S_{zc}$ is applied to a height, or Z, control circuit 66 which drives a Z actuator shown diagrammatically by means of a reel 69 in the motor system 68 for the mirror polygon. An example of such a motor system is described in U.S. Pat. No. 5,171,984.

By refraining from the requirement that the mirror polygon should have a large degree of rigidity and by measuring the consequences of the reduced rigidity, making advantageous use of the position detection system which is already present, and by correcting for this reduced rigidity, the mass of the mirror polygon can be considerably reduced so that a quicker start-up and higher rotation frequencies of the mirror polygon will be possible.

The invention may not only be used in a tape scanning apparatus but also in any scanning apparatus in which a rotating mirror polygon which can move in six degrees of freedom is used. A laser printer and a picture display apparatus may be mentioned as examples.

Figure 7:
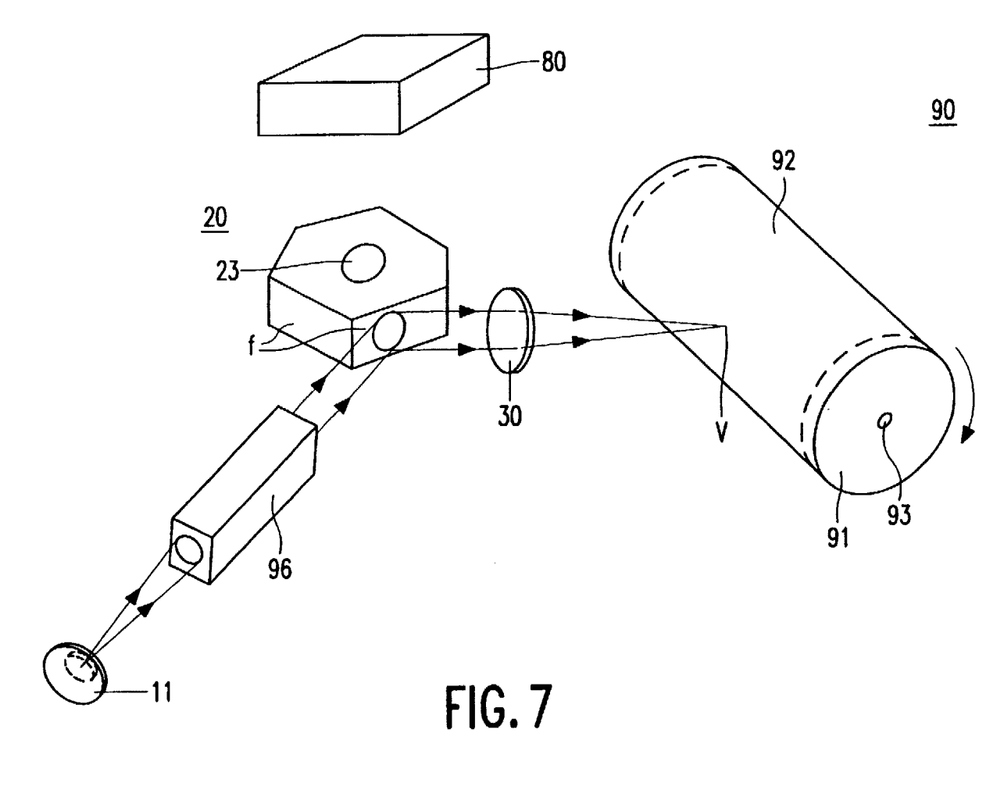
FIG. 7 shows the circuit diagram of a laser printer in which the position detection system can be used.

FIG. 7 shows the principle of a laser printer 90. In such a printer, a photosensitive layer is first written with a scanning laser beam. Subsequently, this layer is passed through an ink bath and then a print on paper is made. The photosensitive layer 92 may be wound around a roll 91 which is rotated about a shaft 93 for describing consecutive lines. The line scanning is realized by means of a mirror polygon 20 having, for example six reflecting facets f and rotating about a shaft 95. The reference numeral 30 denotes an objective lens, for example again an f-θ lens which focuses the radiation coming from a radiation source 11, for example, a high-power diode laser, and reflected by the mirror facets to a radiation spot V on the medium 92. The intensity of the laser beam is modulated in accordance with the information to be written by modulating the current through the diode laser or by means of a separate, for example acousto-optical or electro-optical modulator 96. To detect the position of the mirror polygon in six degrees of freedom, the apparatus is provided with a position detection system 80 which is implemented as described with reference to FIGS. 3 and 6. The mirror polygon may thus be thin and light.

Figure 8:
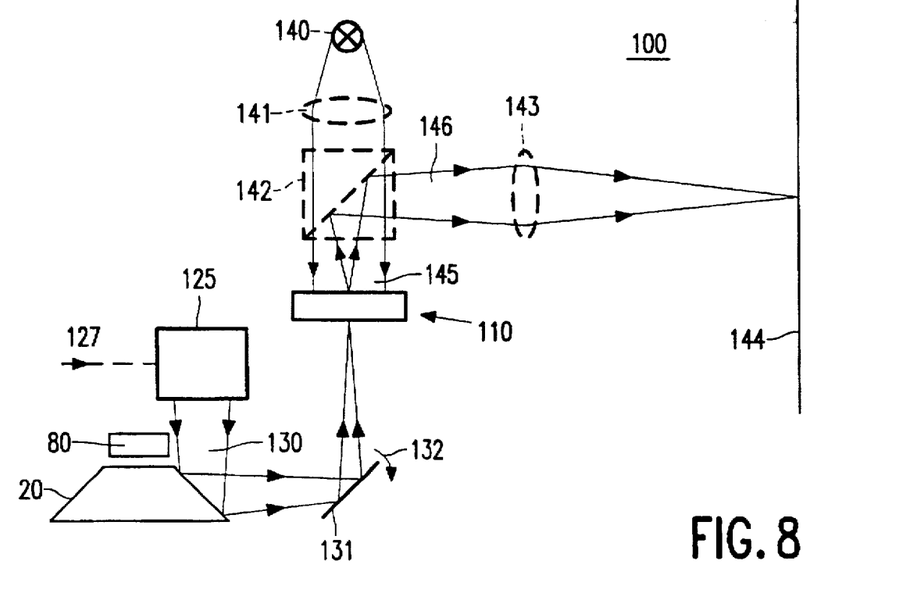
FIG. 8 shows the circuit diagram of a picture display apparatus with a picture display panel which can be written by means of radiation and in which the position detection system is usable.

FIG. 8 shows the circuit diagram of a picture display apparatus 100 in which the picture is generated by a reflecting, radiation-sensitive, i.e. radiation-inscribable, picture display panel 110. The use of such a panel in an image projection apparatus is described in European Patent Application 0,517,517. The advantage of a radiation-inscribable panel as compared with a conventional active matrix panel is that a high light efficiency can be achieved therewith because it is not necessary to provide a matrix of electronic switches and conducting electrodes on the panel surface and because this panel absorbs hardly any radiation.

Figure 9:
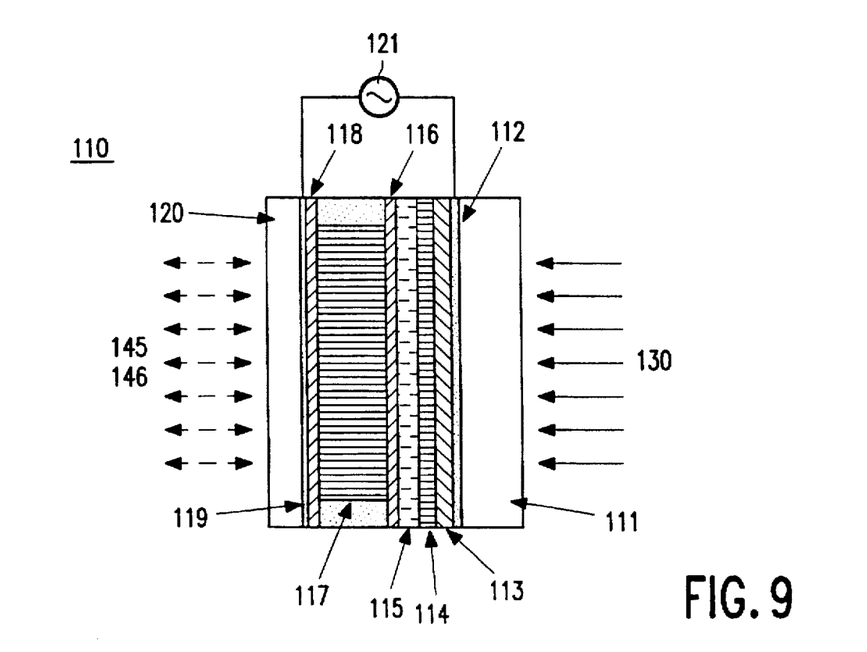
FIG. 9 shows the construction of such a panel.

FIG. 9 shows the structure of the radiation-addressable panel 110. Viewed from the side of the write radiation 130, this panel comprises a first transparent substrate 111 of, for example glass, a transparent electrically conducting layer 112, preferably consisting of indium tin oxide (ITO), a photoconducting layer 113 having a high resistance in the dark and a good conductance if it is exposed and preferably consisting of silicon, possibly a light-obstructing layer 114, a light-reflecting layer 115 preferably consisting of a packet of dielectric layers having a thickness of a quarter wavelength, a first orientation layer 116, a layer of liquid crystalline material 117, a second orientation layer 118, a second transparent electrically conducting layer 119 and a second transparent substrate 120.

This panel is line-sequentially scanned by a write beam 130 coming from a unit 125 accommodating a radiation source, preferably a laser, as well as a beam-shaping optical system to which the information to be displayed, for example a video signal, is applied so that the laser beam is intensity-modulated in conformity with this information. The laser beam 130 is incident on a rapidly rotating mirror polygon 20 and subsequently on a second scanning element 131 which moves more slowly and is formed by, for example a vibrating plane mirror or by a second mirror polygon. The scanning element 131 reflects the beam towards the panel 110. The mirror polygon 20 reflects the converging beam 130 in such a way that the radiation spot formed on the photosensitive layer of the panel describes a line. The second scanning element 131 ensures a relatively slow movement of this radiation spot in a second direction perpendicular to the line direction. Thus, the photosensitive layer 113 of the panel 110 is scanned in two dimensions and a two-dimensional matrix of pixels is written. The use of a mirror polygon for scanning a picture display panel by means of a write beam is known from the English language abstract of Japanese Patent Application 62-56931.

The electrodes 112 and 119 are connected to a voltage source 121. As long as the photoconducting layer 113 is dark, the electrode 112 is isolated from the liquid crystalline layer 117. At any position of the photoconducting layer 113, on which the beam 130 switched at the high intensity level is consecutively incident, the layer becomes conducting and an electric field is locally produced across the liquid crystalline layer so that the orientation of the molecules in this layer changes locally and thus the state of polarization of a corresponding part of a read or projection beam 145 incident from the left changes. This change of polarization is converted in known manner by means of a polarizing analyzer into an intensity variation in the beam 146 reflected by the panel.

As is shown in FIG. 8, the panel 110 with the write system may be used in an image projection apparatus. This apparatus is provided with an illumination unit comprising a radiation source 140 and a beam-shaping optical system 141, which unit supplies an illumination beam 145. This beam illuminates the panel 110 via a polarization-sensitive beam splitter 142. The image formed in this panel is projected on a projection screen 144 by the beam 146 reflected by the panel and by a projection lens 143.

The inscribable panel with the write system may alternatively be used in a direct-vision apparatus in which a viewer directly watches the panel.

To determine the movements of the mirror polygon 20 in six degrees of freedom, the position detection system 80 described above with reference to FIGS. 3 and 6 may be used. The mirror polygon may be thin and light again.

Also in the picture display system which is known as laser TV and with which an image is directly written on a projection screen or on a wall functioning as such by means of a scanning laser beam, or three laser beams in the case of a color image, the scanning device with a mirror polygon may be used. A laser TV apparatus is described in, for example European Patent Application 0, 374,857. In such an apparatus, scanning must take place at a high velocity so that also a mirror polygon is preferably used in this case which rotates at a high speed and free floating in vacuum as described in the above-mentioned SPIE article. A small and light mirror polygon is preferably used in the laser TV apparatus as well, and its position should be determined with maximal accuracy, so that the invention may also be used to advantage in this case.

Another use of the invention is in the field of scanning cameras, notably infrared cameras, in which an image of a scene or object formed by an objective lens is moved across a detector or a row of detectors. Such a camera is described in, for example U.S. Pat. No. 3,706,484. A rapidly rotating mirror polygon is used for line-sequentially moving the image across the detector. The invention may be used again for realizing a high scanning velocity with great accuracy.

Mirror polygons are also used in apparatuses for inspecting objects or workpieces during or after their manufacture, or for reading codes, for example bar codes, on objects, so that the invention may also be used in these apparatuses.

I claim:

1. A scanning device comprising a scanning element and a control system for controlling the position of the scanning element, a non-scanning surface of said scanning element constituting a measuring reference face, said control system comprising a position detection system for detecting the position of the scanning element, an output of said system being connected to a control circuit for correcting the position of the scanning element in a direction perpendicular to the reference face, characterized in that the scanning element is disc-shaped and in that the position detection system supplies a signal which is representative of the bending of the scanning element, said signal being applied to said control circuit via a low-pass filter in order to stabilize the control in said direction.

2. A scanning device as claimed in claim 1, characterized in that the scanning element is a disc-shaped mirror polygon which has mirror facets at its circumference and one of the disc surfaces of which is the reflecting reference face.

3. A scanning device as claimed in claim 1, characterized in that the control system is adapted to control the positions of the scanning element along the three axes of an orthogonal system of coordinates, and the rotations of this element about two of these axes, in that the reflecting reference face is provided with a spherical element, in that the position detection system is adapted to detect said positions and rotations, in that the position detection system comprises a radiation source for supplying a measuring beam, an optical system, provided with a beam splitter, for forming a first measuring sub-beam, focused in the center of curvature of the spherical element, for measuring said positions, and a second measuring sub-beam, incident outside the spherical element on the reference face, for measuring said rotations, and a first and a second detector for the first and the second measuring sub-beam, respectively, arranged in the path of the radiation reflected by the reference face and passing through the optical system, an output of the first detector being connected to a control circuit for correcting the position of the scanning element in a direction perpendicular to the reference face, and in that an output signal of the second detector is the bending signal which is applied to said control circuit via the low-pass filter.

4. A scanning device as claimed in claim 3, characterized in that the optical system is further provided with a reflector which reflects the part of the measuring beam passed by the beam splitter as one of the measuring sub-beams towards the reference face, and in that the beam splitter reflects the other part of the measuring beam as the other measuring sub-beam towards the reference face.

5. A scanning device as claimed in claim 4, characterized in that the beam-separating face of the beam splitter extends at such an angle to the chief ray of the measuring beam that the measuring sub-beam reflected thereby is incident on the reference face at an acute angle to the normal, in that said measuring sub-beam is the second measuring sub-beam, and in that a converging lens system is arranged in the path of the first measuring sub-beam reflected by the reflector.

6. A scanning device as claimed in claim 3, characterized in that the second measuring sub-beam also measures the rotation of the object about the third axis, and to this end, the reference face is provided with at least an area having a reflection which is different from its surroundings.

7. An optical apparatus for electromagnetically scanning a medium, which apparatus is provided with an optical scanning device which, in operation, scans the medium in at least one direction by means of an electromagnetic radiation spot, characterized in that the scanning device is a device as claimed in claim 1.

8. An optical apparatus as claimed in claim 7, in which the medium is a tape-shaped optical record carrier for recording a structure of optically detectable information areas arranged in information tracks which extend in a first direction transversely to the longitudinal direction of the tape, said apparatus being provided with a supply reel and a take-up reel for transporting said carrier in a second direction, being the longitudinal direction of the record carrier, and a radiation source for supplying a scanning beam, the scanning device realizing a scanning movement of the scanning beam in the first direction.

9. An optical apparatus as claimed in claim 7, for writing visually readable signs in accordance with a line pattern into a radiation-sensitive layer, said apparatus being provided with a radiation source for supplying a write beam and means for modulating said beam in conformity with the information to be written, the scanning device ensuring the line scanning.

10. An optical apparatus as claimed in claim 7, for electromagnetically writing a reflecting picture display panel which is provided with a photoconducting layer, said apparatus being provided with a radiation source for supplying a write beam and means for modulating the write beam in conformity with the information to be written, the scanning device being intended for line-sequentially scanning said layer.

11. An optical apparatus as claimed in claim 7, for writing, in accordance with a line pattern, a visible image on a projection screen or a surface functioning as such, said apparatus being provided with a radiation source for supplying a write beam and means for modulating the write beam in conformity with the image to be written, the scanning device being intended for line-sequentially scanning the screen.

12. An optical apparatus as claimed in claim 7, for converting an image of a scene into an electric signal, in which the medium is a radiation-sensitive detector and the scanning device is intended for line-sequentially moving the image across the detector.

13. A scanning device as claimed in claim 2, characterized in that the control system is adapted to control the positions of the scanning element along the three axes of an orthogonal system of coordinates, and the rotations of this element about two of these axes, in that the reflecting reference face is provided with a spherical element, in that the position detection system is adapted to detect said positions and rotations, in that the position detection system comprises a radiation source for supplying a measuring beam, an optical system, provided with a beam splitter, for forming a first measuring sub-beam, focused in the center of curvature of the spherical element, for measuring said positions, and a second measuring sub-beam, incident outside the spherical element on the reference face, for measuring said rotations, and a first and a second detector for the first and the second measuring sub-beam, respectively, arranged in the path of the radiation reflected by the reference face and passing through the optical system, an output of the first detector being connected to a control circuit for correcting the position of the scanning element in a direction perpendicular to the reference face, and in that an output signal of the second detector is the bending signal which is applied to said control circuit via the low-pass filter.

14. A scanning device as claimed in claim 5, characterized in that the second measuring sub-beam also measures the rotation of the object about the third axis, and to this end, the reference face is provided with at least an area having a reflection which is different from its surroundings.

15. An optical apparatus for electromagnetically scanning a medium, which apparatus is provided with an optical scanning device which, in operation, scans the medium in at least one direction by means of an electromagnetic radiation spot, characterized in that the scanning device is a device as claimed in claim 3.

16. An optical apparatus for electromagnetically scanning a medium, which apparatus is provided with an optical scanning device which, in operation, scans the medium in at least one direction by means of an electromagnetic radiation spot, characterized in that the scanning device is a device as claimed in claim 5.

* * * * *